United States Patent
Teng et al.

(10) Patent No.: US 7,529,726 B2
(45) Date of Patent: May 5, 2009

(54) XML SUB-DOCUMENT VERSIONING METHOD IN XML DATABASES USING RECORD STORAGES

(75) Inventors: James Zu-Chia Teng, San Jose, CA (US); Guogen Zhang, San Jose, CA (US); Qinghua Zou, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 11/161,908

(22) Filed: Aug. 22, 2005

(65) Prior Publication Data

US 2007/0043686 A1      Feb. 22, 2007

(51) Int. Cl.
    *G06F 17/30* (2006.01)
(52) U.S. Cl. .................. 707/1; 707/7; 707/200; 707/203
(58) Field of Classification Search .............. 707/1, 707/2, 3, 4, 100, 102, 104, 200, 203
    See application file for complete search history.

(56) References Cited

U.S. PATENT DOCUMENTS

| | | | |
|---|---|---|---|
| 4,794,528 | A | 12/1988 | Hirose et al. |
| 5,151,697 | A | 9/1992 | Bunton |
| 5,608,904 | A | 3/1997 | Chaudhuri et al. ......... 395/602 |
| 5,706,498 | A | 1/1998 | Fujimiya et al. |
| 5,883,589 | A | 3/1999 | Takishima et al. |
| 6,058,397 | A | 5/2000 | Barrus et al. |
| 6,085,188 | A | 7/2000 | Bachmann et al. |
| 6,263,332 | B1 | 7/2001 | Nasr et al. |
| 6,313,766 | B1 | 11/2001 | Langendorf et al. |
| 6,381,605 | B1 * | 4/2002 | Kothuri et al. ............. 707/100 |
| 6,437,799 | B1 | 8/2002 | Shinomi |
| 6,539,369 | B2 | 3/2003 | Brown |
| 6,539,396 | B1 | 3/2003 | Bowman-Amuah |
| 6,563,441 | B1 | 5/2003 | Gold |
| 6,587,057 | B2 | 7/2003 | Scheuermann |

(Continued)

FOREIGN PATENT DOCUMENTS

JP        08190543        7/1996

(Continued)

OTHER PUBLICATIONS

Glance et al, "Generalized Process Structure Grammars GPSG for Flexible Representations of Work" Computer Supportive Cooperative Work, 1996; pp. 180-189.

(Continued)

*Primary Examiner*—Tim T. Vo
*Assistant Examiner*—Dangelino N Gortayo
(74) *Attorney, Agent, or Firm*—IP Authority, LLC; Ramraj Soundararajan; Gregory Plow (57) ABSTRACT

A new sub-document versioning method for record storages of XML documents which uses virtual cutting points to ensure that a search tree is able to support multiple versions of sub-documents and provide efficient mechanisms for XML updating. Record boundaries and virtual cut points divide the two-dimensional space, the horizontal axis representing node identifiers in document order and vertical axis representing version numbers, into rectangles. The bottom corner of the rectangle is used to represent the rectangles and the corresponding information of the corner is added to the search tree index.

8 Claims, 5 Drawing Sheets

U.S. PATENT DOCUMENTS

| | | | |
|---|---|---|---|
| 6,610,104 | B1 | 8/2003 | Lin et al. |
| 6,647,391 | B1 | 11/2003 | Smith et al. |
| 6,810,414 | B1 | 10/2004 | Brittain ............... 709/219 |
| 6,889,226 | B2 | 5/2005 | O'Neil et al. |
| 7,072,904 | B2 * | 7/2006 | Najork et al. ........... 707/103 R |
| 7,080,065 | B1 * | 7/2006 | Kothuri et al. .................. 707/3 |
| 7,246,138 | B2 * | 7/2007 | McCauley et al. ....... 707/104.1 |
| 7,274,671 | B2 | 9/2007 | Hu |
| 7,293,005 | B2 * | 11/2007 | Fontoura et al. ............... 707/1 |
| 7,293,028 | B2 * | 11/2007 | Cha et al. ................... 707/100 |
| 2002/0099715 | A1 | 7/2002 | Jahnke et al. ............... 707/100 |
| 2002/0120679 | A1 | 8/2002 | Hayton et al. |
| 2002/0145545 | A1 | 10/2002 | Brown |
| 2003/0014397 | A1 | 1/2003 | Chau et al. ..................... 707/3 |
| 2003/0023528 | A1 | 1/2003 | Wilce et al. |
| 2004/0002939 | A1 | 1/2004 | Arora et al. ..................... 707/1 |
| 2004/0044959 | A1 | 3/2004 | Shanmugasundaram et al. .......................... 715/513 |
| 2004/0128296 | A1 | 7/2004 | Krishnamurthy et al. .... 707/100 |
| 2004/0167864 | A1 | 8/2004 | Wang et al. ..................... 707/1 |
| 2004/0167915 | A1 | 8/2004 | Sundararajan et al. ...... 707/100 |
| 2004/0205638 | A1 | 10/2004 | Thomas et al. .............. 715/526 |
| 2005/0055336 | A1 | 3/2005 | Hui et al. ....................... 707/3 |
| 2005/0125431 | A1 | 6/2005 | Emmick et al. |

FOREIGN PATENT DOCUMENTS

| | | |
|---|---|---|
| JP | 2001034619 | 2/2001 |
| JP | 2002269139 | 9/2002 |
| JP | 2004178084 | 6/2004 |
| WO | 0142881 | 6/2001 |
| WO | WO 02/03245 | 1/2002 |

OTHER PUBLICATIONS

Kanne, Carl-Christian et al., "Efficient Storage of XML Data," Universität Mannheim, Germany, Jun. 16, 1999, pp. 1-20.

Zhang, Guogen (Gene), "XML Data Model Storage," IBM Confidential, Mar. 17, 2004, pp. 1-10.

Zhang, Guogen (Gene), "XML Data Model Storage Advanced Features," IBM Confidential, Apr. 25, 2004, pp. 1-4.

Fiebig et al., "Anatomy of a Native XML Base Management System," VLDB Journal, Springer Verlag, Berlin, Germany, V11, 2002, pp. 292-314.

Amer-Yahia et al., "Logical and Physical Support for Heterogeneous Data," CIKM 2002 ACM, McLean, VA, Nov. 4-9, 2002, pp. 270-281.

Elias, "Interval and Recency Rank Souce Coding Two On-Line Adaptive Variable Length Schemes," IEEE Transactions on Informatioin Theory, V IT-33, N1, Jan. 1987, pp. 3-10.

Tadayon et al., "Grouping Algorithm for Lossless Data Compression," IEEE Computer Society, Data Compression Conference, Mar. 30-Apr. 1, 1998, 15 pgs.

Grust, "Accelerating XPath Location Steps," ACM SIGMOD 2002, Jun. 4-6, 2002, Madison, WI. pp. 109-120.

Bremer et al., "An Efficient XML Node Identification and Indexing Scheme," Technical Report CSE-2003-04, Dept. of Computer Science, University of California at Davis, 2003, 14pgs.

Bruno et al., "Holistic Twig Joins: Optimal XML Pattern Matching," ACM SIGMOD 2002, Jun. 4-6, 2002, Madison, WI, pp. 310-321.

Li et al., "Indexing and Querying XML Data for Regular Path Expressions," Proceedings of the 27th International Conference on VLDB, Sep. 11-14, 2001, Rome, Italy, pp. 361-370.

Cohen et al., "Labeling Dynamic XML Trees," Proceedings of the 21st ACM SIGMOD-SIGACT-SIGART Symposium on Principles of Database Systems, Jun. 4-6, 2002, Madison, WI, pp. 271-281.

Jagadish et al., "On Effective Multi-Dimensional Indexing for Strings," ACM SIGMOD 2000, May 14-19, 2000, Dallas, TX, pp. 403-414.

"Technique for Performing Generalized Prefix Matches," IBM Technical Disclosure Bulletin, V40, N3, Mar. 1997, pp. 189-200.

Wang et al., "ViST: A Dynamic Index Method for Querying XML Data by Tree Structures," ACM SIGMOD 2003, Jun. 9-12, 2003, San Diego, CA, pp. 110-121.

Guo et al., "XRANK: Ranked Keyword Search over XML Documents," ACM SIGMOD 2003, Jun. 9-12, 2003, San Diego, CA, pp. 16-27.

Garofalakis et al., "XTRACT: A System for Extracting Document Type Descriptors from XML Documents," ACM SIDMOD 2000, Dallas, TX, V29, N2, pp. 165-176.

* cited by examiner

XML SUB-DOCUMENT VERSIONING METHOD IN XML DATABASES USING RECORD STORAGES

CROSS-REFERENCE TO RELATED APPLICATIONS

This application is related to application Ser. No. 11/209,997, entitled "PACKING NODES INTO RECORDS TO STORE XML XQUERY DATA MODEL AND OTHER HIERARCHICALLY STRUCTURED DATA," filed Aug. 22, 2005, and application Ser. No. 11/209,598, entitled "SCALABLE STORAGE SCHEMES FOR NATIVE XML COLUMN DATA OF RELATIONAL TABLES," filed Aug. 22, 2005, both of which are assigned to the assignee of the present application.

BACKGROUND OF THE INVENTION

The present invention relates generally to the field of XML data management. More specifically, the present invention is related to updating and versioning of XML documents or sub-documents.

DISCUSSION OF PRIOR ART

XML has become the de facto standard for information exchange and publishing format on the web. Over the past several years, there has been a tremendous surge of interest in XML data management for document management and for managing more flexibly structured hierarchical data using XML. Clearly, in either case, there is a need to allow users to update XML documents or sub-documents and develop techniques to process them efficiently in database management systems (DBMS). Update capabilities not only include document level updates in which XML documents are simply replaced as a whole when being modified, but also support sub-document updating where changes or deltas are incrementally incorporated into XML documents.

When a small change is made to an XML document, it is more efficient for subscribers to download changes (or delta) rather than the whole document. For example, one primitive way for incorporating a delta into XML documents is to treat XML documents as text files and use a "diff" or similar program to generate delta files. However, to get the new version, a complete document will have to be generated by merging the previous version with the delta before it can be used. Another improved way may use XML elements as units instead of text lines. Up until now delta definition and incorporation has been a largely unanswered problem, addressed with narrow domain-specific approaches.

A typical approach, for example, DeltaXML provides change identification for the XML documents in legal publication industry and is able to store just the delta and the original source file. Multiple revisions of the same document do not require as much storage space as before. This also allows roll-back and roll-forward of any number of changes more efficiently. Such an approach of storing an XML document and its deltas does not address the main challenges of XML updating in DBMS, where XML data may be stored in a data model using records.

Figure 1A:
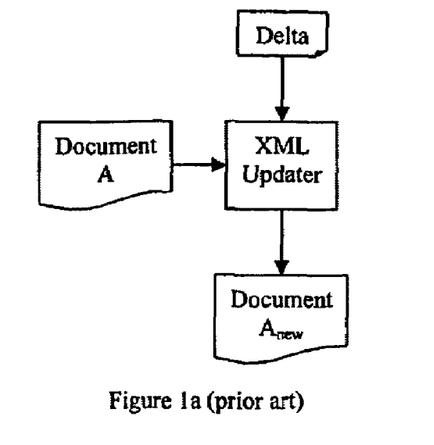
FIG. 1a illustrates a prior art approach to accept delta updates.
Figure 1B:
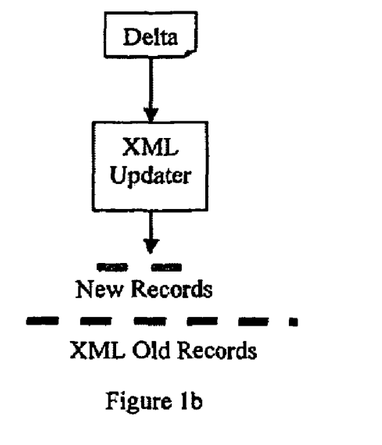
FIG. 1b illustrates an approach to accept delta updates, as per the present invention.

FIG. 1 shows two different approaches to accept XML delta into an XML document. Previous approaches receive deltas and update an XML document to get a new document as shown in FIG. 1a. Clearly, this incurs a large number of disk I/O operations and thus it is not efficient. A better approach is to store an XML document into multiple records and enable updates at sub-document level as shown in FIG. 1b. Thus, the question of "how to manage these XML records with versions?" needs to be answered.

When XML updating is allowed, concurrency control is necessary in order to ensure data consistency. There are many known solutions for concurrency control in the context of database systems such as data item locking, timestamp ordering, or multi-versioning combined with locking or timestamp ordering. These techniques are not directly applicable or too inefficient for XML updating due to hierarchical relationship among data items or enormous number of fine-granular nodes. An application filed by IBM (Ser. No. 10/709,416) uses sub-document locking using pre-fix encoded node IDs for concurrency control without versioning.

Current database systems are designed to support XML update. In stead of storing an XML document as a whole piece, a new technique is used to store XML documents in which an XML document is divided into many records, where each record stores a group of XML nodes. Record-based storage enables updating XML at sub-document level efficiently with low cost. Concurrently filed IBM application titled, "Packing nodes into records to store XML XQuery data model and other hierarchically structured data", discusses such record based storage.

In order to fully explore the new record-based storage, a new efficient technology to support XML sub-document updating with versioning is needed. In a database system, an XML document to be updated may be read by many other XML readers at the same time. In order to ensure that the XML readers read consistent XML data, the concurrency control problem needs to be solved.

The following patents, patent application publications and references provide for methods of retrieving and updating of documents.

Japanese patent assigned to Fujitsu Ltd., (8-190543), discloses a document processor which links document update by a document file and another file at the time of coupling another file to the document file.

Japanese patent assigned to Ricoh Co. Ltd., (2002-269139), discloses a document retrieving method that involves searching a document based on divided character sequence index and word index designating the document.

U.S. patent assigned to Inventec Corp., (U.S. Pat. No. 6,610,104), relates to a method of updating a document by means of appending for enabling a user to easily carry out a query to documents with different versions and switching between them.

U.S. patent application to Wilce et al., (2003/0023528 A1), discloses a document level check-in and check-out concurrency management process. A document lock is maintained on the entire document until the user checks-in the document and the lock prevents another user from making changes to the document.

Article entitled "Generalized Process Structure Grammars (GPSG) for Flexible Representations of work", by Glance et al., discusses the representation of work in workflow systems, and proposes context-free grammar type syntax to represent flexible work process, which can be activity-centric or document-centric. For document-centric cooperative work, documents can be decomposable or non-decomposable. Decomposable documents can be divided into sub-documents. In a multi-authoring environment, documents may be worked on concurrently with multiple versions. The GPSG can be used to describe constraints and relationships between activities. It provides for a check-in/check-out mechanism.

While updating at document level with multiple versions is relatively simple, there is no prior art wherein multiple versions of sub-documents are updated efficiently such that only the changed portion of the XML document is updated using a new version while keeping the rest unaffected in disk or other storage device.

Whatever the precise merits, features, and advantages of the above cited references, none of them achieves or fulfills the purposes of the present invention.

SUMMARY OF THE INVENTION

A method of versioning records in XML documents is provided wherein an XML document modeled as an ordered data tree is transformed into a set of records, each of the records being associated with an identifier as its physical address. Nodes in the data tree are identified and node identifiers are assigned to each of the nodes. A record stores one or multiple nodes. Each record is associated with a timestamp (version number) to indicate the creation time of the record. A two-dimensional space is defined, whose horizontal axis represents node identifiers and vertical axis represents version numbers. The space is divided into rectangles for indexing. A data tree index is built from information corresponding to a bottom right corner (or left corner) of each of the rectangles wherein the information comprises a triple of node identifier, version number and record identifier.

The invention supports boundary based indexing for efficiency; i.e. only the end points of node identifier intervals are indexed. For multi-versioning, a virtual record boundary is introduced that corresponds to a new boundary but does not exist in previous versions to support versions in the index. The invention also proposes the use of freshness of an index, which is the percentage of fresh index points in the index to signal removing old versions. If freshness is below a defined threshold, then removing of old versions is started.

The record identifier corresponding to a node identifier and current version can be identified in a single B+ tree index (or equivalent associative storage) search access. This property is important since most of the XML readers are expected to read up-to-date records. In order to retrieve an old version of a node identifier, a second search following the first index access is required.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
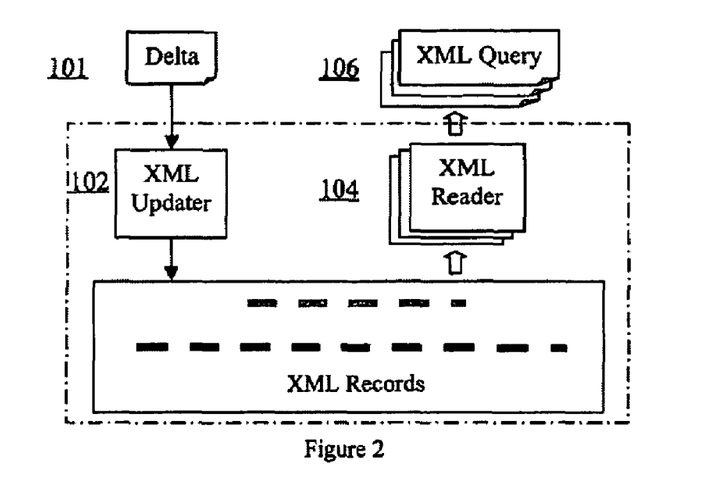
FIG. 2 illustrates a single thread for XML updating and multiple threads for XML reading.

The present invention uses the approach shown in FIG. 1b to accept XML delta into an XML document. The XML document is stored in the form of multiple records and updates are enabled at sub-document level. Concurrent transactions update and read XML documents in a serialized fashion. In a simplified concurrency control scheme, a centralized thread is used for XML updating and multiple threads are used for XML readers as illustrated in FIG. 2. The XML updater 102 creates new records to reflect the changes/delta 101 of the XML document. It uses versioning to keep track of the set of records at a certain timestamp. An XML reader 104 reads a particular version of XML records for an XML query 106. The version read depends on the purpose of the context with which the versioning method is applied. For user document versioning, the version number is supplied by the application. For concurrency control with versioning, the version number (a timestamp also) is determined by the timestamp of the transaction, where the transaction reads the latest and consistent version of a document at the transaction timestamp assigned by the DBMS. The following description assumes a timestamp used for version number. This versioning technique can be used for user document versioning. This versioning technique can also be applied to multi-versioning concurrency control with locking or timestamp ordering that is well known in the art.

An XML document is usually modeled as an ordered labeled tree. In order to identify the nodes in the tree, each node is assigned a unique node identifier (nid). In one of IBM's previously filed applications titled, "Self-Adaptive Prefix Encoding for Stable Node Identifiers" (Ser. No. 10/709,415), a new node labeling scheme which has the property of Dewey identifiers and supports dynamic insertion and deletion of nodes without affecting the existing identifiers was proposed. The present invention also uses such a scheme.

XML data tree is packed into records where a record is a structure of variable size that resides in a page of a certain size of contiguous disk space, e.g., 8K or 16K bytes. Each record has an identifier, called record identifier (rid), as its physical address. A record stores one or multiple XML nodes. When an XML node is too large to fit into a record, some of its descendants will be stored in different records. In case a single node is larger than a record of the maximum size, it is split into several records with continuation nodes in them.

Once an XML data tree is transformed into a set of records, an index for mapping node identifiers (nid's) to record identifiers (rid's) needs to be built, so that a record for a given nid can be easily determined. Such an index is called a node id index thereafter. The node id index can be built using B+ tree (or other similar indexing methods) with key nid and value rid, i.e., nid->rid. It is unnecessary to store an entry in the index for every nid. Instead, only the end (or start) boundaries of node id intervals for records need to be stored, since XML nodes are stored into records sequentially. The end boundaries are preferred due to correspondence of index entry sequence with document order, but the start boundaries may be used as well. The detail of the tree packing and basic node id indexing scheme is beyond the scope of this invention (see concurrently filed IBM application entitled, "Packing nodes into records to store XML XQuery data model and other hierarchically structured data").

When XML updating is allowed using multi-versioning in an embodiment of this invention, each record is associated with a timestamp (or a version number that is monotonically increasing) to indicate the creation time of the record. When an update arrives, the corresponding records are selected and new records of a current timestamp (or vno) are generated to revise them. Thus, each entry of the node id index is a triple of three variables (nid, vno, rid). The goal is to use DBMS well supported B+ tree or similar index methods to find the rid for a given (nid, vno). The search operation on an index is to find entries between a given lowerkey and highkey pair. Vno is in descending order, usually bit-wise flipped in the index, since index entries with a vno that is the largest of those smaller than or equal to a given vno are searched.

Figure 3:
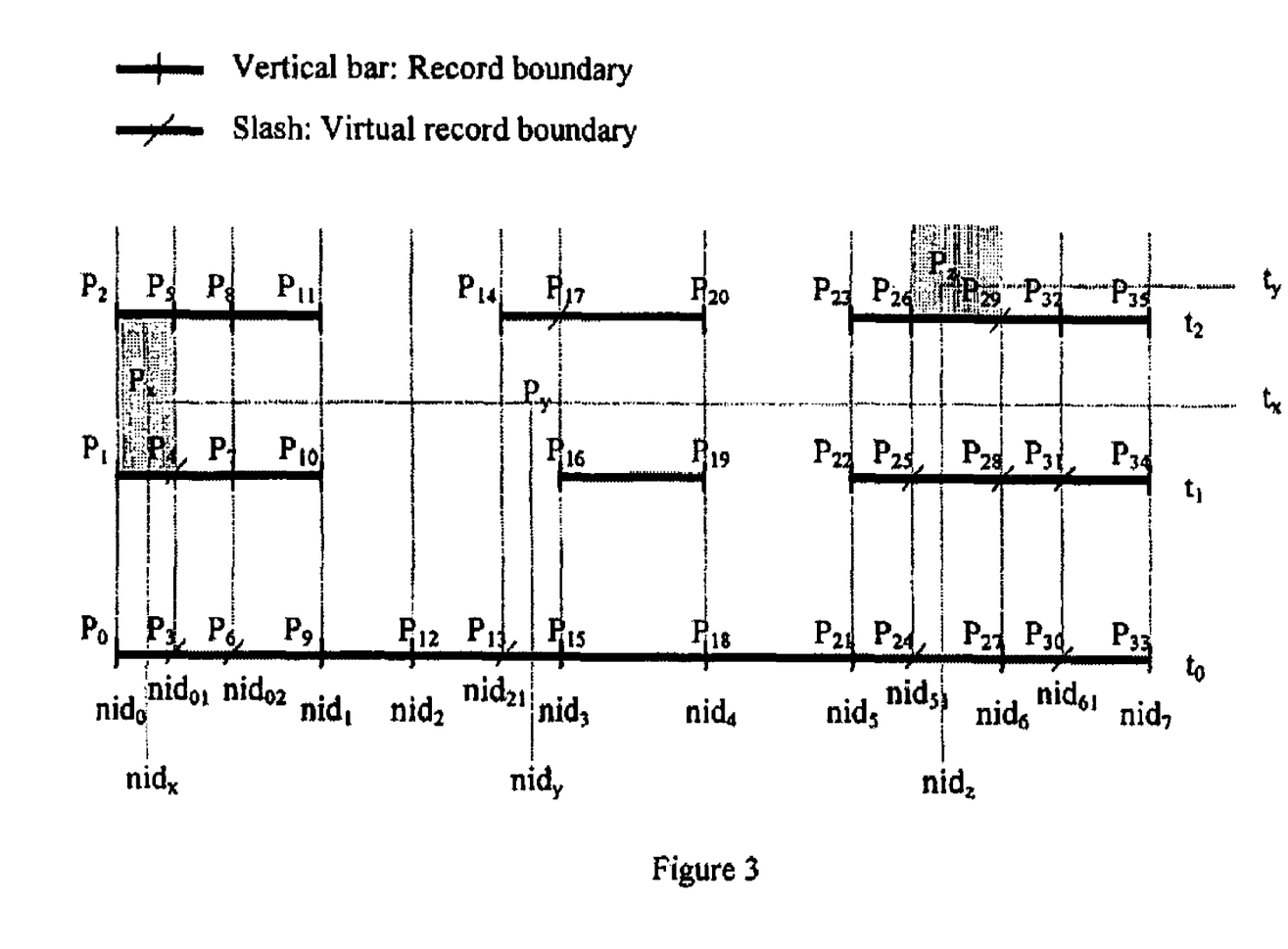
FIG. 3 illustrates using virtual record boundary for XML sub-document versioning, as per the present invention.

FIG. 3 shows node identifiers in the ascending order in the horizontal axis and version numbers in the vertical axis. A vertical bar represents a record boundary (also an end point of node id intervals). A slash represents a virtual record boundary. There are two possible B+ tree index key arrangements for record boundaries:

1) (vno, nid)->rid: Indexed order is first vno and second nid. This method requires multiple probes of the B+ tree in order to determine the rid for an unmatched vno, including the latest version. For instance, for a transaction with timestamp $t_x$ looking for node nidy, in an index search, any $t_1$ version will stop the search because $t_x > t_1$. The search will then have to continue with the new target version set to $t_1$. So this approach is not efficient for accessing the latest version since it will in most cases give an infrequent update.

2) (nid, vno)->rid: Indexed order is first by nid and second by vno. This method requires one probe of the index for the latest version, but also requires multiple probes to the B+ tree for an older version.

To reduce the number of probes in the index, virtual boundaries are introduced. If virtual boundaries are ignored and only record boundaries are indexed, the correct mapping from (nid, vno) to rid cannot be performed efficiently. For example, according to FIG. 3, considering only record boundaries using right end point of intervals, there should be following sequence of entries in B+ tree, P5, P8, P7, P11, P10, P9, P14, P17, P16, P15, P20, P19, P18, etc., where each point is a triple of three values (nid, vno, rid) as follows:

P5: (nid01, t2)>rid3
P8: (nid02, t2)>rid4
P7: (nid02, t1)>rid2
P11: (nid1, t2)>rid5
P10: (nid1, t1)>rid2
P9: (nid1, t0)>rid0
. . .

For the input Px as (nidx, tx), where nidx <$nid_{01}$ and tx<t2, the search for Px would return P5 since Px<P5 in the above sequence. Because Px.nidx <P5.nid01 and tx<t2, the search will have to continue with nid=nid01, i.e. searching for Px' (nid01, tx). Next we will hit P8, because Px'<P8. This is not the result yet, since tx<t2. We really need to find P7, but index scanning would be needed to achieve this. Thus, the index would have to be searched multiple times to find P7 which stores the correct rid for Px.

To solve the above problems, virtual record boundaries are added, as shown by slash in FIG. 3, which together with record boundaries (shown by vertical bars) divide the space into a series of rectangles. There are two types of rectangles:

Definition 1: A rectangle is called a close rectangle if its upper corners are known. Otherwise, it is called an openrectangle. For example, the rectangles containing Px and Pz are close and open respectively.

To find the rid of a given nidx at version vnox, the bottom-right corner of the rectangle containing the search point (nidx, vnox) is to be located. Therefore, only indexes of bottom-right points of all the rectangles are needed.

Definition 2: A point is an index point if it is a bottom-right corner of some rectangle. If the rectangle is open, then the index point is a fresh or non-virtual index point. Otherwise, it is a stale or virtual index point.

In FIG. 3, P5, P8, P7, P11, P10, P9 and P12 are index points while P0, P1, P2, P14, P16, P22, and P23 are not. P11 and P12 are fresh index points. P10 is a stale index point. Only index points need to be added into B+ index. There are 29 index points and 12 of them are fresh index points in FIG. 3. That is, the indexing points include not only the end record boundaries but also the virtual end boundaries. When the virtual index points are included, the previous index entry sequence example becomes the following:

P5: (nid01, t2)>rid3 (fresh)
P4: (nid01, t1)>rid1 (virtual)
P3: (nid01, t0)>rid0 (virtual)
P8: (nid02, t2)>rid4 (fresh)
P7: (nid02, t1)>rid2 (stale)
P6: (nid02, t0)>rid0 (virtual)
P11: (nid1, t2)>rid5 (fresh)
P10: (nid1, t1)>rid2 (stale)
P9: (nid1, t0)>rid0 (stale)
. . .

Definition 3: The ratio of the number of fresh index points to that of all the index points is called the freshness of the index.

For example, the freshness of the index in FIG. 3 is 12/29=0.41. In reality, the freshness will be much higher since the number of records updated is usually small. This parameter can be used to control the removal old versions from the system. If the freshness is smaller than a given threshold, system starts a background process to clean old versions that are no longer needed for concurrency control. While in user document versioning, clean-up of old versions are initiated by user applications.

Figure 4:
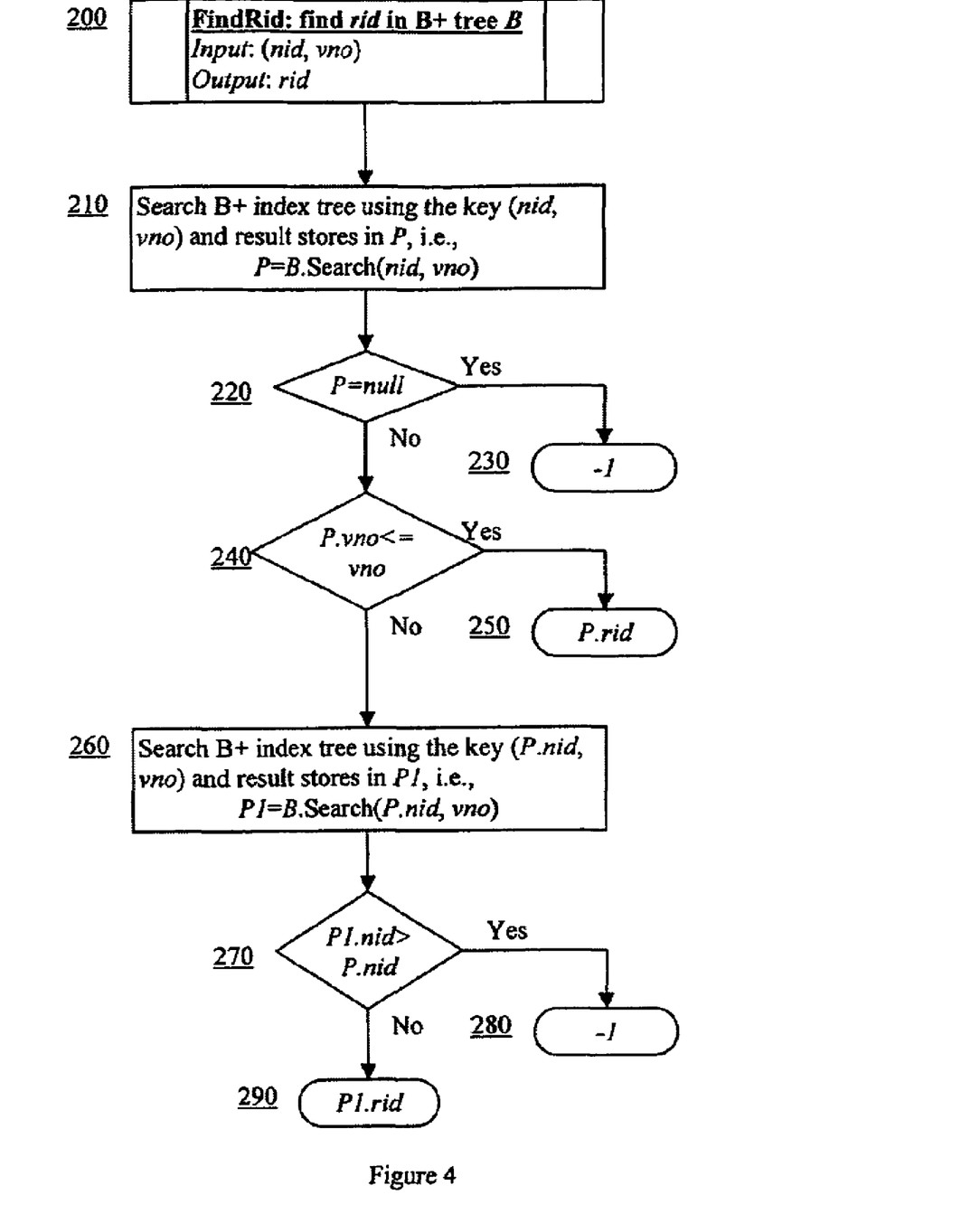
FIG. 4 illustrates the searching of record id of a node id at a version number, as per the present invention.

FIG. 4 shows the logic used for searching record ids. FindRid procedure locates the rid for a given nid at a version vno. Suppose the search function provided by B+ tree always returns the smallest point P larger than or equal to the search key. The input to FindRid is a pair (nid, vno) and the output is rid as shown in step 200. The B+ tree B is first searched with the key (nid, vno) by calling B.Search(nid, vno) and the resulting index point is stored in P in step 210. If P is null, it means that the nid is larger than every node identifier in B. In this case, −1 (or NOTFOUND) indicating no record stores such a nid is returned as shown in steps 220 and 230. Otherwise, if P's version number is less than vno, then P's record id P.rid is retruned as shown in step 250. In other words, if the returned P is a fresh index point, then P.rid is returned in step 250. Note that the present invention needs only one access to the B+ index to get the correct rid for the up-to-date (nid, vno).

In case an old version of a record is queried, the search in 210 returns an index point where P.nid will be larger than or equal to nid but P.vno may be greater than vno. Thus, another search needs to be performed to determine the correct version number. Step 260 shows the second access to the B+ index with a new key (P.nid, vno), which can be achieved by following the previous index point position P for efficiency. If P1.nid>P.nid (step 270), which means a user is trying to get a non-existent version, −1 is returned (step 280). Otherwise, P1 has the index point with the correct node identifier and version number. Thus P1.rid is returned (step 290). Note that two index probes can find the correct rid for a stale version regardless of the number of versions.

The correctness of the above process is clear by the following reasons. As shown in FIG. 3, the goal of FindRid is to get the bottom-right corner for a key (nid, vno). The first B+ tree index access B.Search(nid, vno) returns the fresh index point with the correct boundary node identifier. The second access B.Search(P.nid, vno) searches for a stale index point with the correct node identifier.

The following are examples to assist in the understanding of the search process, referring to FIG. 3:

1. Search for (nidx, tx)

By searching B+ tree index with (nidx, tx), P5 is obtained first. Then P4 is obtained by accessing the B+ tree with (P5.nid, tx), i.e., (nid01, tx). The corresponding rid (rid1) is the record id for nidx.

2. Search for (nidy, tx)

By searching B+ tree index with (nidy, tx), P17 is obtained first. Then, P15 is obtained by accessing the B+ tree with (P17.nid, tx), i.e., (nid3, tx). The corresponding rid is the record id for nidy.

3. Search for (nidz, ty).

By searching B+ tree index with (nidz, ty), P27 is directly obtained since P26 is fresh index point. That is, for fresh index point, only one B+ tree access is needed.

Figure 5:
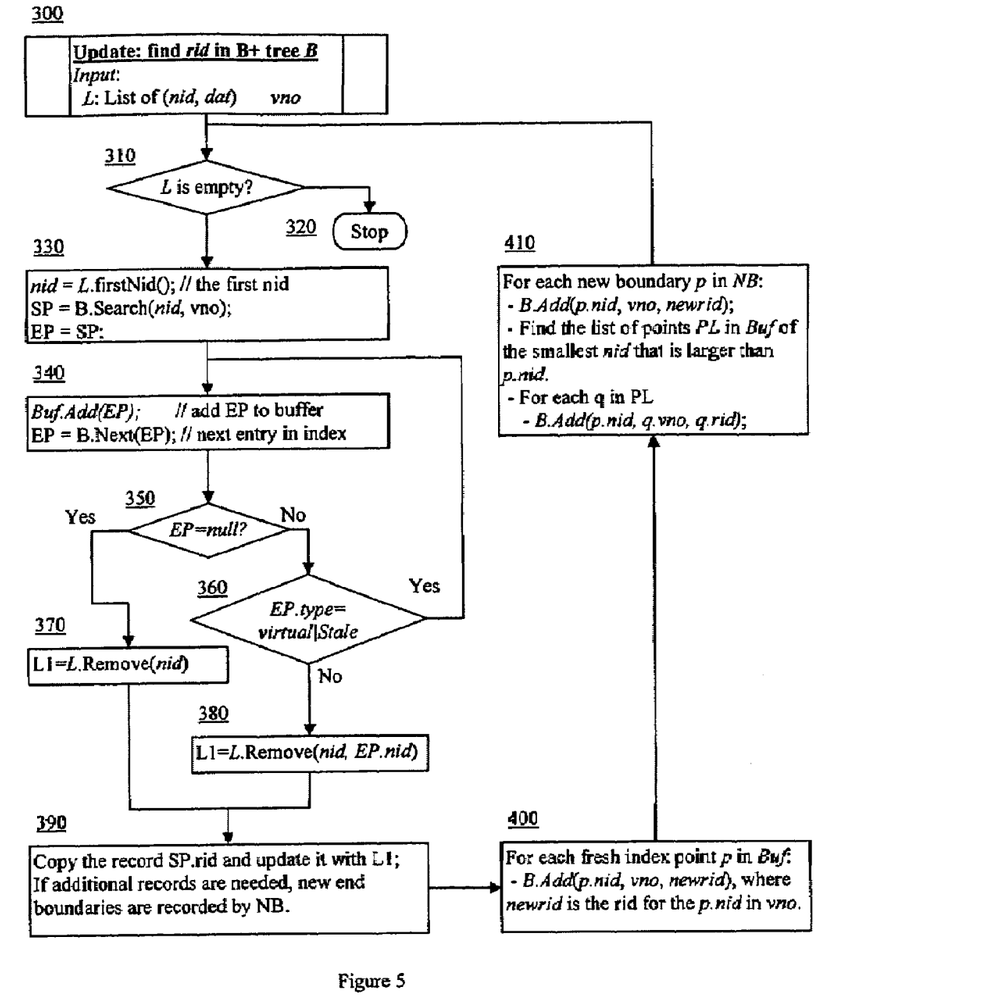
FIG. 5 illustrates the updating of records with a list of node identifiers and their contents, as per the present invention.

FIG. 5 shows the logic for updating records which is able to insert, remove, and update a list of XML nodes. The input is a list L of node identifiers and their contents with a new version number vno as shown in step 300. The list L allows removing, inserting, and updating xml nodes.

To remove an XML node, the node id with empty content is added to the input list L.

To insert an XML node, a new node id is created and is added with its content to the input list L.

To update an XML node, the node id and its new content is added to the input list L.

The items in L are sorted by nids in the ascending order. Starting from the first item (by SP—start index point) in L, the last item in L (by EP—end index point) is determined, which is stored in the same record as SP in the last version. A new version of the record is then created by incorporating the update items from SP to EP. This one-record-at-a-time strategy continues till the end of L. More specifically, it loops until the list L is empty as in steps 310 and 320. Otherwise, it searches the B+ tree with the first nid in L to find the start index point SP and buffers all the stale or virtual index points by the function buf.add(EP) till a fresh and non-virtual index point, i.e., the start nid for the next record is found, which is then stored in EP as shown in steps 340, 350, and 360, where in step 340, B.Next(EP) is to get next index entry sequentially following EP. If it is the last record containing the nid, then all the items in L at the same time are considered and removed from L to L1 as in step 370. Otherwise, the lists of items with node identifiers in the range between nid and EP.nid are removed and stored in L1 as in step 380. Thus, all intersecting records with all versions are identified by searching the B+ tree and the intersecting points, i.e. the virtual index points are also identified by finding the start index point and determining the end index point in the same record as the start index point in a prior version.

L1 represents a list of update items in L which are mapped into the same record. In step 390, the records are retrieved and a new version of the records is created by updating it with the list items in L1. This process may result in zero, one, or multiple records.

Then, new index points for the new version of records need to be created. In step 400, an index point for each buffered fresh point in buf is created. In step 410, a list of virtual index points is created for each new boundary in NB which is created when additional records are needed. Note that in case the whole record is removed, the record id for the indexing points will be set to −1 (or a DELETE flag).

The following is an example to assist in the understanding of the updating process, referring to FIG. 3:

Let's suppose that at t2 the record P1-P7 is updated into two records P2-P5 and P5-P8. The record P1-P7 represents the record containing nids in the range between nid0 and nid02, corresponding to P1 and P7, where P1 and P7, are two neighboring record boundaries. Since P7 is a fresh index point before t2, an index point P8 with version number t2 is created corresponding to P7. For the new boundary P5, three index points P3, P4, and P5 are created with version numbers t0, t1, and t2 respectively, where P3 and P4 are two virtual index points.

Now let's suppose at time t2, the record P16-P19 is updated into a new record P14-P20, where P14 is less than P16. Since P15 (same nid as P16) and P19 are fresh index points at version t1, two corresponding index points P17 and P20 are created. Since P14 is a new boundary, P13 is created with version number t0. Note a virtual point for P14 at version t1 is not created since P15 is a fresh index point.

Figure 6:
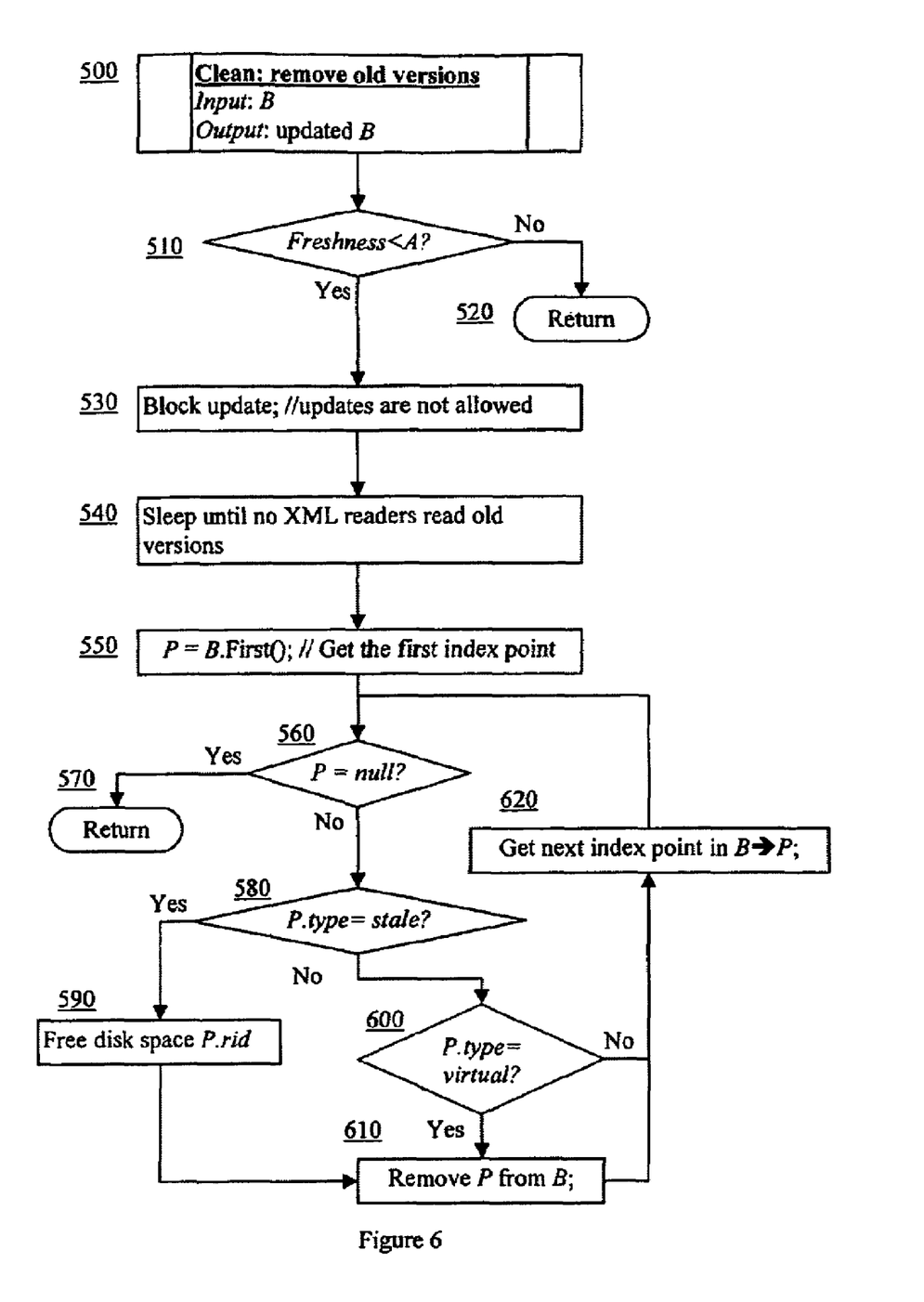
FIG. 6 illustrates the removing of old versions from the system, as per the present invention.

FIG. 6 shows the logic for removing old versions. It takes the B+ tree as input and removes all the stale and virtual index points starting in step 500. If the freshness is not below a given threshold, then there are not many old versions that affects performance, old versions do not need to be removed as in steps 510 and 520. Otherwise, removing process is begun. Step 530 temporarily blocks updates for the document by setting a flag. Step 540 waits until no XML readers read old versions of the XML records. In Step 550, the B+ tree is sequentially scanned from the first entry. For each entry in B+ tree, if it is stale index point, the corresponding disk is freed and the entry is removed as in Steps 580 and 590. Otherwise, if it is virtual index point, the entry is removed as in Steps 600 and 610. It loops till the end of B+ tree as in Steps 620 and 590.

The following is an example to assist in the understanding of the removing process. Let's suppose that no XML reader reads the old versions t0 and t1 in FIG. 3. The index points in B+ tree are then scanned sequentially starting from P5. Since P5 is a fresh index point, it is kept. Next P4 is removed since P4 is virtual. P3 is removed since it is a virtual index point and the process is continued for the entire B+ tree. The final index points in B+ tree will be P5, P8, P11, P14, P20, P23, P26, P32, and P35.

The alternative removing criteria are the freshness of the index and the versions that are older than the oldest reader in the system. This only needs to add a condition to check for each entry for the version. If it is smaller than the oldest reader's timestamp, then it is removed. Otherwise, it is kept.

Thus, the present invention provides a new sub-document versioning method that can be used for document versioning or concurrency control, which uses virtual cutting points to ensure a B+ tree is able to support multiple versions of sub-documents and provide efficient mechanisms for XML updates. The present invention provides for uninterrupted consistent views of XML documents to all XML readers to support a large number of XML queries. Also, the sub-documents are updated such that only the necessary sub-portion is changed with the rest of the document being unaffected in disk or other storage device.

Additionally, the present invention provides for an article of manufacture comprising computer readable program code contained within implementing one or more modules to version records of XML documents. Furthermore, the present invention includes a computer program code-based product, which is storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for:

(a) representing node identifiers and version numbers in two-dimensional space along with record boundaries;

(b) adding virtual record boundaries to the record boundaries and dividing the dimensional space into a series of rectangles;

(c) building a search tree index from information corresponding to a bottom corner of each of the rectangles, this information comprising a triple of node identifier, version number and record identifier.

CONCLUSION

A method has been shown in the above embodiments for the effective implementation of a XML sub-document versioning method in XML databases using record storages. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats.

What is claimed is:

1. A computer-based method for versioning records of XML sub-documents in a database implemented in computer storage, said method comprising:

representing node identifiers and version numbers in two-dimensional space along with record boundaries, a horizontal axis in said two-dimensional space representing said node identifiers in document order and a vertical axis in said two-dimensional space representing said version numbers;

adding virtual record boundaries to said record boundaries and dividing said dimensional space into a series of rectangles being any of a close rectangle if respective upper corners are known or an open rectangle if respective upper corners are not known, said virtual record boundaries added to support multiple versions of said sub-documents;

building a search tree index comprising index points corresponding to a bottom corner point of each of said open or closed rectangles, each of said index points comprising a tripe of node identifier, version number and record identifier; and wherein a record identifier for a given node identifier at a version number is identified, said identification process comprising the following steps:

searching said search tree index with a key comprising said node identifier and version number, storing, in said computer storage, a first index point based on the result of said searching;

if said first index point is null, returning −1, indicating no record stores said node identifier, else if said first index point is not null, comparing the versions number corresponding said first index point with the versions number corresponding to said key;

if the version number corresponding said first index point is less than or equal to the version number corresponding to said key, returning said first index point' record identifier, else if the version number corresponding said first index point is not less than or equal to the version number corresponding to said key, searching said search tree index with a key comprising said first index point' node identifier and the version number corresponding to said key;

storing a second index point based on the result of said searching; and if said second index point' node identifier is greater than said first index point' node identifier, returning −1, indicating a non-existent version, else returning said second index point' record identifier.

2. The method according to claim 1, wherein said search tree is a B+ tree.

3. The method according to claim 1, wherein said bottom corner points are right corner points of said rectangles.

4. The method according to claim 1, wherein a ratio of a number of fresh index points to a number of all index points is determined as a freshness of index and old versions of records are removed if a freshness value is less than a defined threshold value.

5. The method according to claim 4, wherein the process of removing old versions is delayed until no XML readers are reading said old versions of the records.

6. The method according to claim 1, wherein said records are updated, said updating process comprising the following steps;

identifying each new record, identifying all intersecting records with all versions by searching said search tree index and identifying intersecting points, said intersecting points being virtual index points;

creating index points for said new record boundaries; and creating index points for said virtual index points.

7. The method according to claim 6, wherein said intersecting points are identified, said indentifying process comprising the following steps:

sorting items in a list by node identifiers in ascending order;

finding a start index point by searching said search tree index with a first node identifier; and determining an end index point stored in the same record as said start index point in a prior version, wherein all intersecting points are buffered from said start index point to said end index point, said intersecting points being virtual index points.

8. The method according to claim 1, wherein old versions of records are removed explicitly or by a background process if freshness is below a given threshold, said removal process comprising the following steps:

identifying stale and virtual index points by searching said search tree index;

removing stale index points and corresponding records; and removing virtual index points.

* * * * *